United States Patent [19]

Kronn

[11] 3,893,189

[45] July 1, 1975

[54] MAGNETIC RECORD/REPRODUCE HEAD AND MANUFACTURING METHOD THEREFOR

[75] Inventor: Willem L. Kronn, Putten, Netherlands

[73] Assignee: Spin Physics, Inc., San Diego, Calif.

[22] Filed: Jan. 14, 1974

[21] Appl. No.: 433,038

[52] U.S. Cl. .................... 360/127; 29/603; 65/33; 65/56; 360/121

[51] Int. Cl. .................... G11b 5/00

[58] Field of Search .......... 29/603, 604; 65/33, 56; 360/125–127, 121

[56] References Cited

UNITED STATES PATENTS

| | | | |
|---|---|---|---|
| 3,196,522 | 7/1965 | Bernstein et al. | 29/604 |
| 3,611,557 | 10/1971 | Hardardt et al. | 29/603 |
| 3,660,892 | 5/1972 | Tanaka et al. | 29/603 |
| 3,681,044 | 8/1972 | Ruszczyk et al. | 29/603 X |
| 3,737,294 | 6/1973 | Dumbaugh, Jr. et al. | 65/33 |
| 3,761,641 | 9/1973 | Mlinaric | 29/603 X |
| 3,783,504 | 1/1974 | Prival et al. | 29/603 |

*Primary Examiner*—Carl E. Hall
*Attorney, Agent, or Firm*—Robert F. Cody

[57] ABSTRACT

Arrays for use in the manufacture of magnetic record and/or reproduce heads are provided by stacking laminations of ceramic-convertible glass which has been chemically machined to provide apertures in the laminations. The "apertured" laminations act as holders for ferrite and ceramic pieces. When the glass is fired, it devitrifies, resulting in the laminations, ferrite, and ceramic fusing into an integral assembly which may then be further processed into one or more magnetic heads.

9 Claims, 9 Drawing Figures

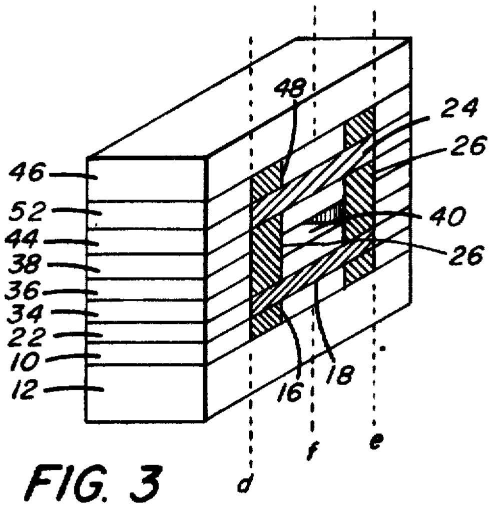
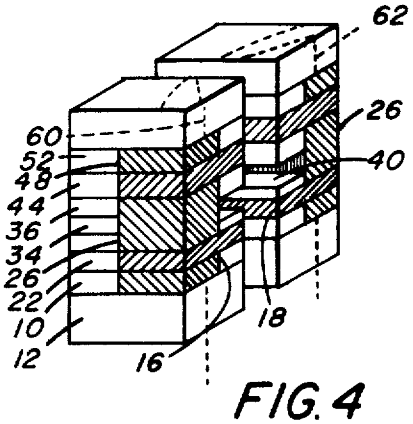
FIG. 4
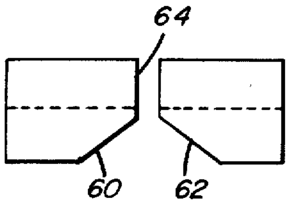
FIG. 5
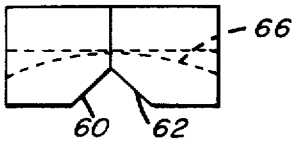
FIG. 6
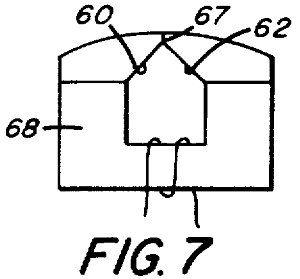
FIG. 7

MAGNETIC RECORD/REPRODUCE HEAD AND MANUFACTURING METHOD THEREFOR

BACKGROUND OF THE INVENTION

1. Field of the Invention

The present invention relates in general to magnetic recording and reproduce heads, and more particularly to face assemblies therefor, and to methods of manufacturing such face assemblies. Although not so restricted, the invention has particular relevance to multi-track heads and to their methods of manufacture.

2. Description of the Prior Art

Reference is had to U.S. Pat. Nos. 3,224,073 and 3,761,641 as representative of the art over which the invention is an improvement: As disclosed in each of such patents, two sets of slots are sliced into a relatively elongated ceramic block, the first set of slots being fitted with ferrite pieces which are bonded in place. The block and ferrite assembly (which hereafter shall sometimes be referred to as the basic track array assembly) is then halved longitudinally and, after a gapping substance is deposited on the ends of the exposed ferrite pieces, the two block halves are bonded back together. Then the second set of slots is fitted with ferrite shield pieces which are bonded to both halves of the ceramic block. The gap between each half of a ferrite piece corresponds to a given information track, the shield pieces being disposed, for example, between pairs of adjacent track-defining ferrite pieces. The whole face assembly is then shaped to optimize the gap cross-sections; and after which the face assembly is fitted with a rear assembly, including magnetic elements, and coils, for completing the magnetic circuits of the track-defining ferrite pieces.

While a head which is manufactured according to the prior art may be functionally acceptable, its structure is such as to leave something to be desired from a manufacturing standpoint: In the event a defect should occur anywhere within the ceramic material, the whole head could result in being a reject. Also, since the prior art teaches the use of a "ceramic comb" that is fitted with track-defining ferrite pieces, fracturing of the relatively brittle comb teeth, either while slotting the ceramic block, or after such slotting, is a distinct possibility. Further, concerning the prior art use of a "ceramic comb," track positioning, and track-to-track spacing, relative to the ceramic block is limited by relatively imprecise procedures for forming slots in the ceramic.

SUMMARY OF THE INVENTION

The invention proposes that track array assemblies for use in magnetic record and/or reproduce heads be formed using laminations of any of that class of glasses which may be devitrified to form what are called glass ceramics, and which glasses are chemically machineable. Cut-outs are machined in the glass laminations so that such laminations may serve as holders for various ferrite and ceramic parts. With the laminations stacked upon each other, and holding such ferrite and ceramic parts, the stack is fired, causing the laminations of glass to devitrify into ceramic, and causing the stack to fuse into an integral assembly which may then be diced and processed as in the prior art.

An object of the invention is to provide record and/or reproduce head structures which lend themselves to efficient manufacture thereof.

Another object of the invention is to provide a process for the batch manufacture of assemblies useful in the manufacture of record and/or reproduce heads.

The invention will be described with reference to the Figures, wherein:

FIG. 1 indicates a stacked assemblage of material according to one embodiment of the invention;

FIG. 2 indicates a basic track array assembly resulting from the assemblage of FIG. 1;

FIGS. 3 through 6 depict various procedures leading to a head face assembly embodying the invention;

FIG. 7 depicts a face assembly, according to the invention, which has been fitted, at least in part, with back assembly components;

Figure 8:
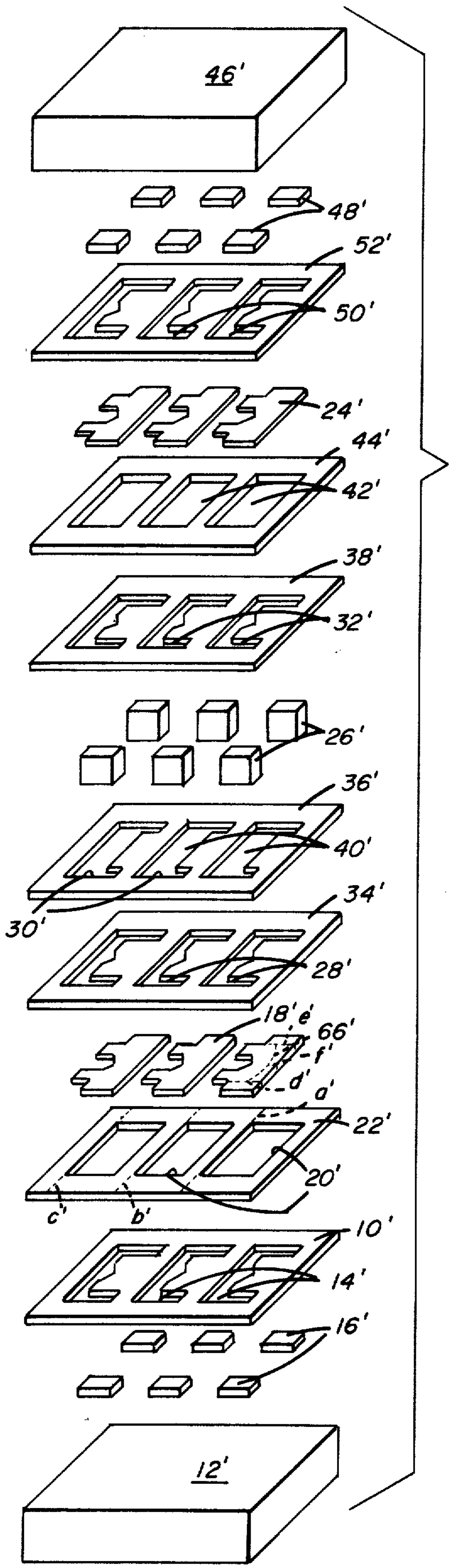
Figure 9:
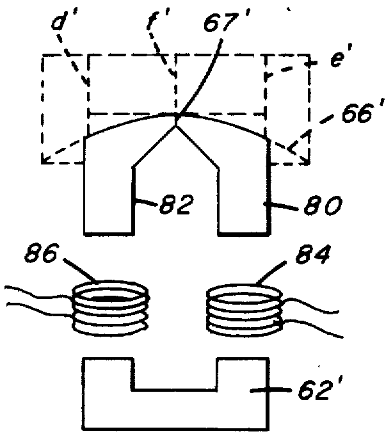

FIG. 8 indicates a stacked assemblage of material according to another embodiment of the invention; and FIG. 9 indicates the assembly of a head resulting from the stack depicted in FIG. 8.

Figure 1:
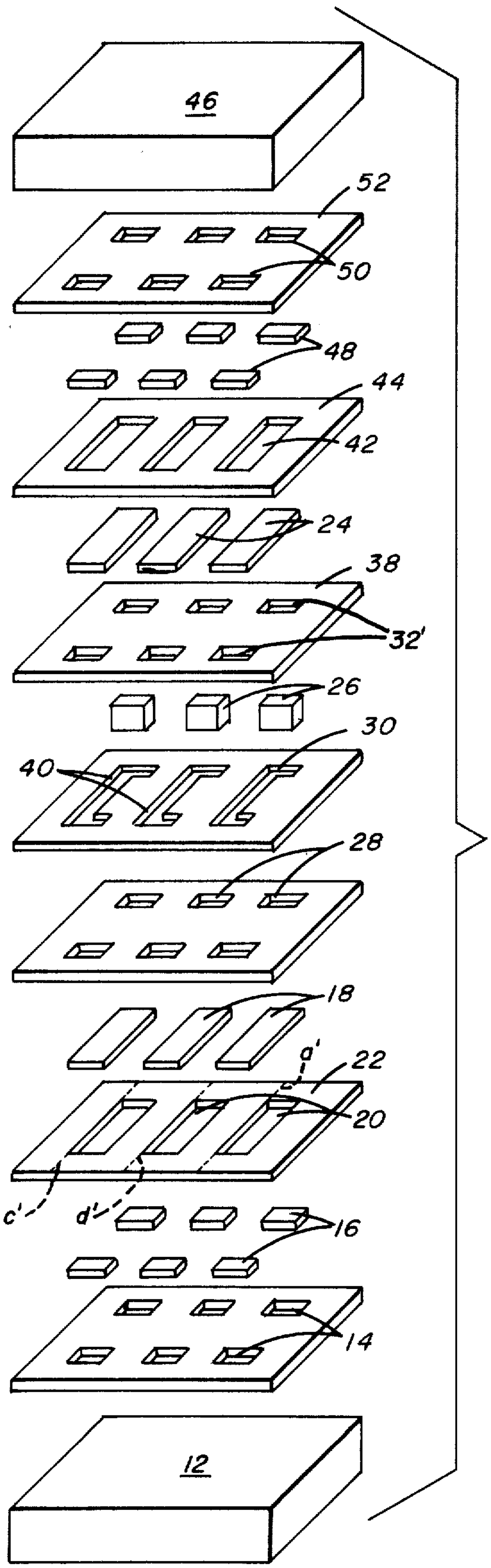
Figure 2:
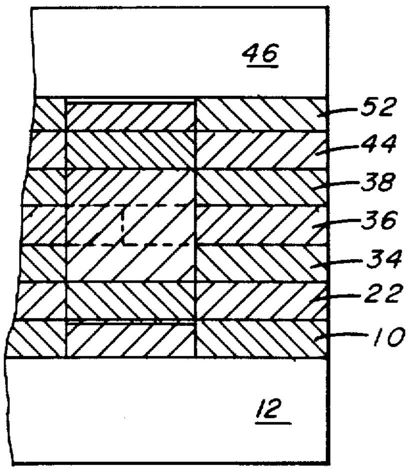

Referring to FIGS. 1 through 7, and in particular to FIGS. 1 and 2, a first lamination 10 of ceramic-convertible glass is laid upon a ceramic base 12. The glass forming the lamination 10 is of a chemically machineable type which has been pre-machined to provide apertures 14, and support ferrite pieces 18 held within apertures 20 of a pre-machined ceramic-convertible glass lamination 22. The ferrite pieces 18 are spaced from a second set of ferrite pieces 24 by means of ceramic spacers 26. The spacers 26 are held within aligned apertures 28, 30, 32, respectively, of pre-machined laminations 34, 36, 38 of glass. Openings 40, additionally, are pre-machined in the lamination 36, thereby to provide slots for accommodating, for example, ferrite shields.

The ferrite pieces 24 are held within pre-machined apertures 42 of a ceramic-convertible glass lamination 44; and the ferrite pieces 24 are positioned a predetermined distance from a ceramic cap 46 by means of ceramic spacers 48 which are held within pre-machined apertures 50 within a ceramic-convertible glass lamination 52. As depicted in FIG. 1, three two-track arrays are under construction, although it will be obvious that a greater number of arrays, and arrays with a different number of tracks, may be provided by means of the invention.

The ferrite pieces 18, 24 — and the ceramic spacers 16, 26, 48 — are all lapped to size having close tolerances, thereby to provide accurate track and track-to-track dimensions.

Concerning the matter of chemically machineable ceramic-convertible glass, this is a well-known commodity having been well described in the literature: e.g., in American Chemical Society, Industrial and Engineering Chemistry, Volume 45, page 115, January 1953; and in the text, "Glass Ceramics," by P. W. McMillan, Academic Press, Inc., 111 Fifth Avenue, New York, N.Y., Library of Congress No. 64–8067. One such glass which has been found to have particular utility for practicing the invention is the glass known as Fotoceram which is available from Corning Glass Works, Corning, N.Y. Having been suitably machined, Fotoceram becomes like other ceramic-convertible glass which, in response to heat, devitrifies into ceramic.

The invention places no constraints on the forms of the ceramic, ferrite, and glass which are employed, other than that the glass thermally devitrify at a temperature below the melting points of the ferrite and ceramic. Also, it is preferable that the thermal expansion and wear properties of the ferrite and ceramic-convertible glass be compatible.

While pressure is applied to the ceramic pieces 12, 46 of FIG. 1, squeezing the stack, the stack is fired at a temperature at which the machined glass — but not the ferrite and ceramic — melts, and devitrifies into ceramic. Then the stack is cooled, resulting in an assemblage of three comb-less basic track array assemblies having precise track and track-to-track dimensions; and all without need for the separate, and relatively tedious, prior art step of bonding ferrite pieces to their supporting ceramic.

The stack of FIG. 1 is then cut into three separate track array assemblies along cut lines *a,b,c*. As used herein, all cut and contouring lines are depicted as dotted lines; and, to facilitate understanding, cut and contouring lines are depicted where they will be most illustrative, e.g., in FIG. 1, the cut line *a* has been placed along one edge of the aperture 20 of the lamination 22, thereby to show that one side of the ferrite piece 18 is fully exposed by the cut *a*. See also FIG. 3.

Having produced three track array assemblies, each is then trimmed (cut lines *d,e* — FIG. 3) and halved (cut line *f*) to produce a pair of half-sections (FIG. 4) from which a two-track face assembly may be made. The pair of half-sections are then chamfered (60, 62 — FIGS. 4 and 5) and, as is the practice in the art, a gap-defining spacer material, e.g. $Al_2O_3$, is coated on a half-section surface 64, after which the half-sections are bonded into an integral assembly (FIG. 6). The assembly of FIG. 6 is then contoured (line 66 — FIGS. 4 and 6) to dimension the depth of the head gap 67; and then the face assembly is fitted with a rear assembly which may take any of a variety of forms. Typically, FIG. 7 shows coil-supporting magnetic elements 68 for completing magnetic circuits corresponding to the ferrite parts of the face assembly.

Reference should now be had to FIGS. 8 and 9 which show how the invention may be implemented to batch manufacture heads in which the track-defining ferrite pieces have pole projections 80, 82 on which coils 84, 86 may be slipped. In all respects, the stacking, i.e., material and order, indicated in FIG. 8 is like the stacking indicated in FIG. 1, the corresponding parts/cut lines, etc, of FIGS. 8 and 9 having the same designations as parts/cut lines of FIGS. 1 through 7 but being, however, primed. As a further aid to understanding the implementation of FIGS. 8 and 9, particular attention is drawn to ferrite piece 18', and on which cut and contour lines (*d',e'f'* and 66') have been depicted. See also the cut/contour lines of FIG. 9. As with the implementation of FIG. 1, the invention — as practiced according to the disclosure of FIGS. 8 and 9 — is based upon the stacking of stencil-like laminations of ceramic-convertible glass which serve as holders for ferrite and ceramic pieces; when such glass is devitrified into ceramic, the holders, together with the ferrite and ceramic pieces, fuse into an integral assemblage from which track array assemblies may be formed as in the prior art.

The invention has been described in detail with particular reference to preferred embodiments thereof, but it will be understood that variations and modifications can be effected within the spirit and scope of the invention.

I claim:

1. An assembly for a magnetic record and/or reproduce head made by the process of:

a. machining at least one aperture in a lamination of ceramic-convertible glass of the type which is machineable;

b. placing a ferrite member within said aperture;

c. sandwiching said glass and ferrite assemblage between a pair of laminations of ceramic-convertible glass;

d. machining at least one aperture in each of said pair of laminations of ceramic-convertible glass;

e. placing a ceramic spacer within each of the last-named apertures so that said spacers may abut against said ferrite member; and f. firing the whole assemblage to cause said glass to devitrify into ceramic while pressing said spacers against said ferrite.

2. The assembly of claim 1 modified by the additional step of shaping said ferrite member, before it is placed within its aperture, to provide pole projections.

3. The method of making an array useful in the manufacture of a magnetic record and/or reproduce head, comprising the steps of:

a. abutting a first lamination of ceramic-convertible glass having an aperture, and a ceramic spacer within said aperture, against a base;

b. placing a second lamination of ceramic-convertible glass having an aperture, and a ferrite member within said aperture, in contact with said first lamination so that said spacer and ferrite are in contact with each other;

c. placing a third lamination of ceramic-convertible glass having an aperture, and a ceramic spacer within said aperture, so that (1) the spacer within the aperture of said third lamination and said ferrite are in contact with each other, and (2) said second lamination is sandwiched between said first and third laminations;

d. sandwiching said three laminations between said base and a cap; and e. devitrifying said glass into ceramic, whereby said sandwiches fuse into an integral assembly.

4. The method of claim 3, including the additional steps of:

a. so placing a fourth lamination of ceramic-convertible glass having an aperture that the spacer within the aperture of said third lamination extends into the aperture of said fourth lamination;

b. placing a fifth lamination of ceramic-convertible glass having an aperture, and a ferrite member within said aperture, in contact with said spacer extending through the aperture of said fourth lamination; and c. placing a sixth lamination of ceramic-convertible glass having an aperture, and a ceramic spacer within said aperture, in contact with said fifth lamination so that the ferrite member thereof is sandwiched between the spacer extending through the aperture of said fourth lamination and the spacer of said sixth lamination;

whereby when said glass laminations are devitrified, a multitrack array is formed.

5. The method of claim 4, including the additional step of placing spacer material between said third and fourth laminations for defining a space within said array which may house a magnetic shield between said ferrite members.

6. The method of claim 4, including the additional step of pre-forming both said ferrite members with pole projections.

7. The method of claim 3, including the additional step of pre-forming said ferrite member with pole projections.

8. The method of making a batch of arrays useful in the manufacture of magnetic record and/or reproduce heads, comprising the steps of:

a. producing first and second laminations of ceramic-convertible glass having respective pluralities of apertures therein;

b. placing ceramic spacers in at least some of the apertures of both said laminations;

c. producing a third lamination of ceramic-convertible glass having a plurality of apertures;

d. placing ferrite members in at least some of said apertures of said third lamination;

e. sandwiching said third lamination between said first and second laminations so that at least some of said ferrite members are contacted by a ceramic spacer from both of said first and second laminations;

f. firing said sandwich so that said glass devitrifies into ceramic, thereby causing said sandwich to fuse into an integral assemblage; and g. dicing said assemblage into a plurality of elements comprising ferrite sandwiched between ceramic parts.

9. The method of claim 8, including the additional step of pre-forming at least some of said ferrite members with pole projections.

* * * * *

UNITED STATES PATENT AND TRADEMARK OFFICE

CERTIFICATE OF CORRECTION

PATENT NO. : 3,893,189

DATED : July 1, 1975

INVENTOR(S) : Willem L. Kroon

It is certified that error appears in the above-identified patent and that said Letters Patent are hereby corrected as shown below:

In the heading, the inventor's name, which is shown as "Willem L. Kronn", should read -- Willem L. Kroon --.

Signed and Sealed this

*seventeenth* Day of *February 1976*

[SEAL]

*Attest:*

RUTH C. MASON
*Attesting Officer*

C. MARSHALL DANN
*Commissioner of Patents and Trademarks*